US009407964B2

(12) United States Patent
Somasundaram et al.

(10) Patent No.: US 9,407,964 B2
(45) Date of Patent: Aug. 2, 2016

(54) METHOD AND SYSTEM FOR NAVIGATING VIDEO TO AN INSTANT TIME

(71) Applicant: Verizon Patent and Licensing Inc., Basking Ridge, NJ (US)

(72) Inventors: Poothabalan Somasundaram, Tamilnadu (IN); NarayanaDhoss Gopalakrishnan, Tamil Nadu (IN); Saravanan Vijayakumar, TamilNadu (IN); Arunkumar Surulinathan, Theni District (IN); Manjunathan Ramanathan, Vellore (IN); Thamilenthi Palanivelu, Chennai (IN); Maria M. Sagayaraj, Tamil Nadu (IN); Ravi Chandra Appasani, Irving, TX (US); Rajeswaran Venugopal, TamilNadu (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 384 days.

(21) Appl. No.: 14/063,370

(22) Filed: Oct. 25, 2013

(65) Prior Publication Data
US 2015/0121225 A1    Apr. 30, 2015

(51) Int. Cl.
*G06F 3/0488* (2013.01)
*G06F 3/0484* (2013.01)
*G06F 3/0482* (2013.01)
*H04N 21/472* (2011.01)
*H04N 21/422* (2011.01)
*H04N 21/431* (2011.01)

(52) U.S. Cl.
CPC ... *H04N 21/47217* (2013.01); *H04N 21/42224* (2013.01); *H04N 21/4316* (2013.01); *G06F 3/0488* (2013.01)

(58) Field of Classification Search
CPC .... G06F 3/0488; G06F 3/0484; G06F 3/0482
See application file for complete search history.

(56) References Cited

U.S. PATENT DOCUMENTS

2013/0070145 A1*   3/2013   Matsuyama ....... H04N 5/23216
                                                 348/333.12
2013/0145268 A1*   6/2013   Kukulski ............. G11B 27/034
                                                 715/719

* cited by examiner

*Primary Examiner* — Andrea Leggett (57) ABSTRACT

A system and method are presented for navigating through image frames of video content to display particular frames of the video content while the video content continues to play. The system provides a viewer the ability to interact with and operate a device playing video content using touch input or input from a peripheral device to permit locating and displaying particular frames of video content concurrently with ongoing display of the video content.

20 Claims, 7 Drawing Sheets

METHOD AND SYSTEM FOR NAVIGATING VIDEO TO AN INSTANT TIME

FIELD OF THE INVENTION

The field of the present invention relates generally to facilitating the viewing of video frames within a video by navigating through video frames by a user input.

BACKGROUND

Viewers of videos often desire to go back and view a particular video frame or sequence of frames of a video they are watching. To do this, the viewer typically has to scroll the video back multiple frames at a time in a cumbersome manner in order to find the desired frame. Moreover, this scrolling is typically done while the video is either paused or not playing at the default frame rate. The viewer, however, may wish to continue watching the video while locating and/or viewing particular frames of interest. For example, the video may be of an instructor in a classroom teaching a lecture and the viewer may be a student at a distant location watching the lecture live or a previously-recorded version of the lecture. During the lecture the instructor will likely walk around, leave the podium, write on a whiteboard, or refer to a presentation on a screen away from the lecturer, for example. The camera recording the lecture may temporarily pan to the whiteboard or presentation screen, or zoom in on various objects, and then pan back to the lecturer. This presents a disadvantage to the distant student in that such a student is unable to view both the whiteboard/presentation screen and the lecturer at the same time, but instead must view only what is captured by the camera. Students in the classroom, meanwhile, can view any portion of the classroom with a simple turn of their head. To view earlier portions of the video that focused on the whiteboard or presentation screen, the distant student has to scroll back to the instant the camera panned to the relevant area, in order to view what is readily viewable to students in the classroom. This is just one example of many where viewers of video are limited when trying to refer to other video frames in the video. The present disclosure addresses many such limitations and presents exemplary embodiments having advantages over the current state of the art.

BRIEF DESCRIPTION OF THE DRAWINGS

In order to facilitate a fuller understanding of the exemplary embodiments, reference is now made to the appended drawings, in which like reference characters are used to indicate like elements. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive.

The description below describes modules that may include one or more servers, databases, subsystems and other components. As used herein, the term "module" may be understood to refer to non-transitory executable software, firmware, hardware, and/or various combinations thereof. Modules, however, are not to be interpreted as software that is not implemented on hardware, firmware, or recorded on a tangible processor-readable or recordable storage medium (i.e., modules are not software per se). The modules are exemplary. The modules may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

Embodiments of the system provide the ability to interact with and operate a device playing video content using input from a user such as touch input or input from a peripheral device (e.g., mouse or trackpad), for the exemplary purpose of locating and displaying particular frames of video content concurrently with ongoing display of the video content.

Figure 1:
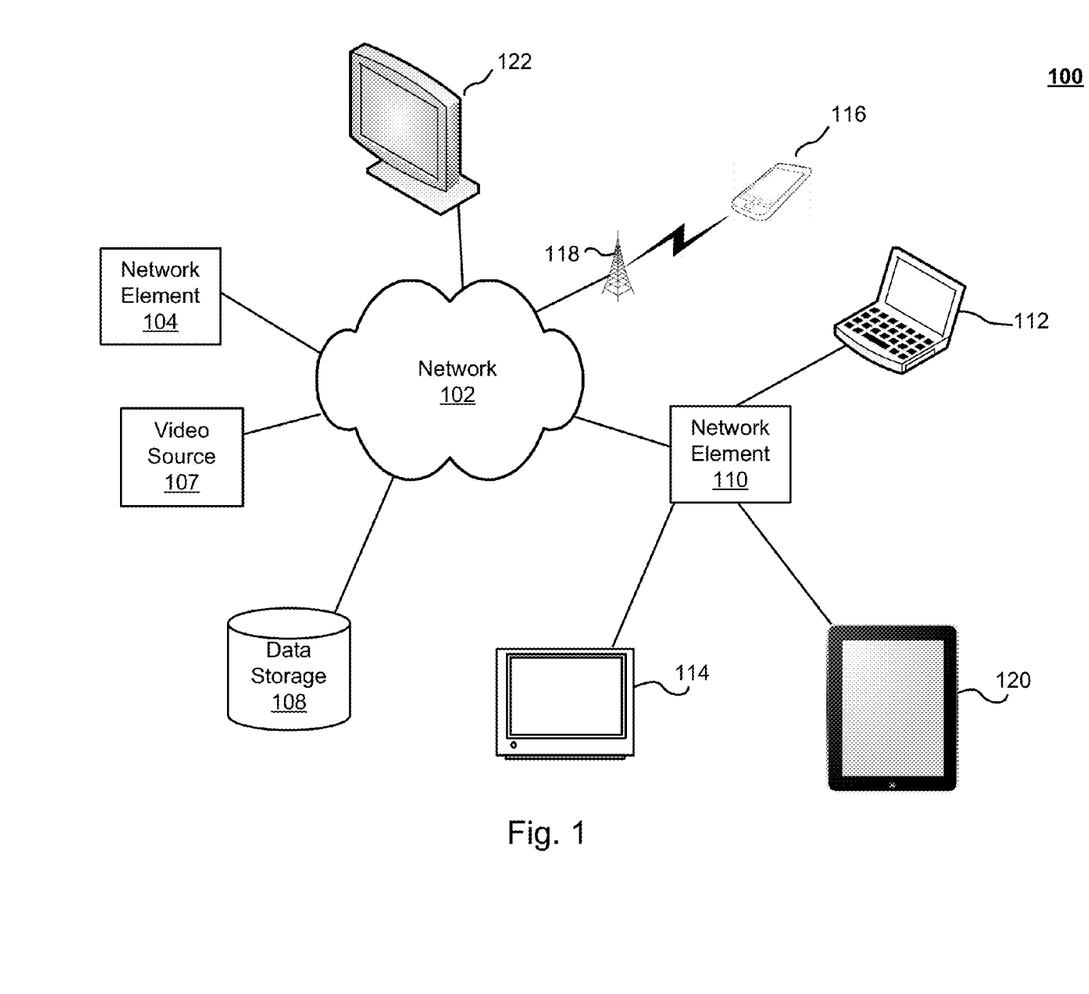
FIG. 1 depicts a block diagram of a system architecture for sending video content through a network, according to an exemplary embodiment.

Referring to FIG. 1, a schematic diagram of a system 100 for delivering video content to video displaying devices, according to an exemplary embodiment. As illustrated, network 102 may be communicatively coupled with one or more video displaying devices, one or more video transmitting devices or entities, network element 110, or wireless transceiver 118. Exemplary video displaying devices may include a mobile phone 116, tablet 120, network client (e.g., computer) 112, video display 122, or television 114, for example. These and other types of video displaying devices may be communicatively coupled directly with network 102 or via one or more intermediary devices, such as transceiver 118 or network element 110. In particular, mobile device 120 and mobile phone 116 may be communicatively coupled directly with network 102 or via transceiver 118.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, Bluetooth, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cellular network, corporate networks, or home networks.

Network client 112 may be a desktop computer, a laptop computer, a tablet, a server, a personal digital assistant, or other computer capable of sending or receiving network signals. Network client 112 may use a wired or wireless connection. It should also be appreciated that the network client 112 may be a portable electronic device capable of being transported. Such a device may transmit or receive signals and store information in transit, and in the event it is transported, the portable electronic device may still operate using the data (e.g., digital video) it stored.

Transceiver 118 may be a repeater, a microwave antenna, a cellular tower, or another network access device capable of providing connectivity between different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Mobile device 120 may be a mobile communications device, a smartphone, a tablet computer, a wearable computer such as in the form of a wrist watch or glasses, a home phone, a cellular phone, a mobile phone, a satellite phone, a personal digital assistant, a computer, a handheld multimedia device, a personal media player, a gaming device, a mobile television, or other devices capable of displaying video and communicating directly with network 102 or via transceiver 118. Preferably, mobile device 120 is capable of receiving a user input, such as in the form of a touch input. Other forms of user input may be used, such as a stylus, mouse, keypad, trackpad, keyboard, gesture input not using touch, motion input, or buttons. Any video displaying device capable of receiving user input may be used with the present invention, but for convenience reference will be made to a "tablet" 120 capable of receiving a touch input.

Network element 110 may transmit and receive data to and from network 102. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection. A number of different types of signals may be transmitted via network 102 including, but not limited to, signals indicative of information content, such as a video signal.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data, such as video content.

Network element 104 and video source 107 may be one or more servers (or server-like devices), such as a Session Initiation Protocol ("SIP") server. Network element 104 and video source 107 may include one or more processors (not shown) for recording, transmitting, receiving, or storing data. According to one or more embodiments, network element 104 and video source 107 may be servers providing media content to one or more users. In other embodiments, network element 104 and/or video source 107 may be servers that provide network connection between two or more wireless devices 118. Network element 104 and video source 107 may also be servers of a service provider, the Internet, a broadcaster, a cable television network, or another media provider. Other devices in FIG. 1, such as mobile device 120, network element 112, mobile phone 116, or television 114 may capture video and thereby be considered a video source.

According to one or more embodiments, network client 112 and mobile device 120 using a wireless connection may authenticate with a network using Wired Equivalent Privacy ("WEP"), Wi-Fi Protected Access ("WPA"), or other wireless network security standards. Network client 112 and mobile device 120 may connect to network 102 and communicate with other network elements, servers or providers using WiFi, 3G, 4G, Bluetooth, or other chipsets.

System 100 may also transmit and/or receive a variety of content. The various components of system 100 as shown in FIG. 1 may be further duplicated, combined or integrated to support various applications and platforms. Additional elements may also be implemented in the systems described above to support various applications. It should be appreciated that the term, "computing device," as used herein, may refer to any component associated with system 100, as described above. These may include, but are not limited to, vendor-side components 104-108, subscriber-side components 110-124, or any other device communicatively coupled to network 102 or associated with system 100.

It should be appreciated that the system 100 of FIG. 1 may be implemented in a variety of ways. Architecture within system 100 may be implemented as a hardware component (e.g., as a module) within a network element or network box. It should also be appreciated that architecture within system 100 may be implemented in computer executable software (e.g., on a tangible computer-readable medium). Module functionality of architecture within system 100 may be located on a single device or distributed across a plurality of devices including one or more centralized servers and one or more mobile units or end user devices.

As used herein, "video" or "video content" is considered to be comprised of a series or sequence of still image frames such that when the image frames are displayed on a video display device, they depict scenes in motion. "User" may be used interchangeably with "viewer."

Figure 2:
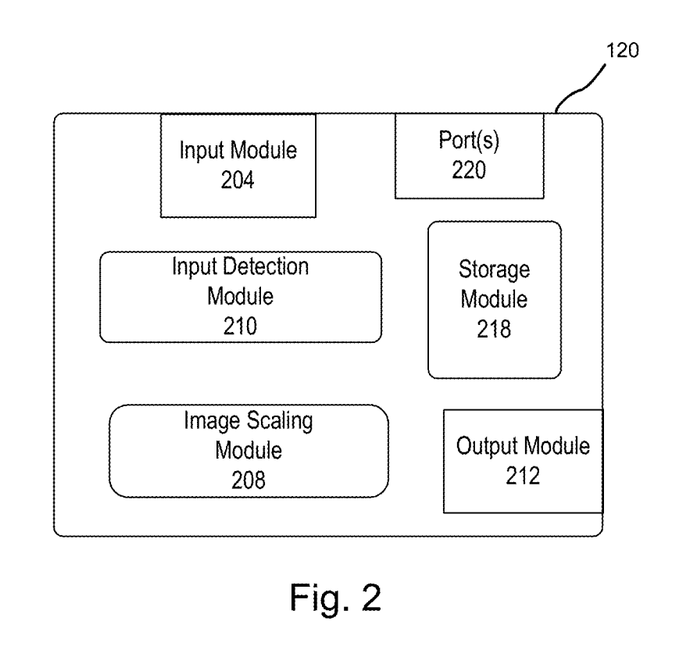
FIG. 2 depicts a block diagram of a hardware module at a mobile device for navigating to particular frames of video content, according to an exemplary embodiment.

Referring to FIG. 2, a block diagram of exemplary modules within mobile device 120, such as a tablet (hereafter tablet 120), for processing, displaying, and navigating video is shown, according to an exemplary embodiment. Network element 104, video source 107, or data storage 108 may send video content to input module 204 of tablet 120 via network 102. Alternatively, tablet 120 may capture video content itself for later viewing. The video content may be stored in storage module 218 for later viewing or may be viewed in real-time on the display screen, e.g., as it is being received by tablet 120. Storage module 218 may be a permanent data repository for storing video content, or may be a buffer data repository when the video content is viewed in real-time.

Figure 3:
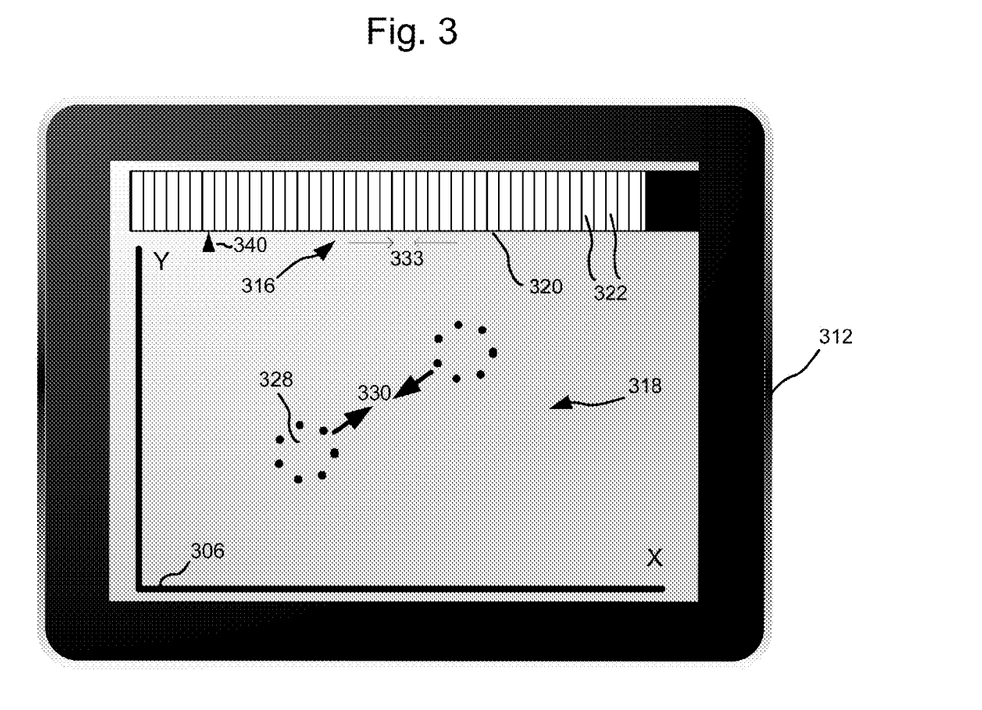
FIG. 3 depicts navigation of video content on a display screen of a mobile device, according to an exemplary embodiment of the invention.

Output module 212 may be configured to read data from storage module 218 and thereby display video on the display screen 312 (shown in FIG. 3). Output module 212 may communicate with other modules, such as image scaling module 204 or input detection module 210. For example, when input detection module 210 detects that a user has pressed various controls, such as play/pause, forward, or reverse, the output module 212 may display the appropriate video or image accordingly. If play/pause is pressed, output module 212 may start or stop processing video content for display. If pause is pressed, a single image from the video content may be displayed. If forward or reverse is pressed, the output module 212 will jump to the relevant frame of the video content. For example, pressing forward may cause output module 212 to advance to the next chapter of the video content, the beginning of which chapter may be a particular frame of the video content, and which frame may be tagged or designated in storage module 218 as the beginning of the particular chapter. Output module 212 may display video or images separate from and concurrent to video or images displayed by the image scaling module 208.

Image scaling module 204 may also be configured to read video content from storage module 218 and provide the video content or a modified form of the video content to display screen 312. Modified forms of the video content may take the form of a timeline 320 of images 322 that make up all or a portion of the video content, or may take the form of a single image or a sequence of images from the video content. The timeline 320 or image(s) may be considered "modified" in the sense that the size (dimensional or resolution) of the images may be different than the default size of the displayed video content. For example, the timeline 320 may comprise a sequence of images from the video content, which images only take up a small portion of the display screen 312 (see e.g., FIGS. 3-6). Similarly, a single image 622 from the video content may be displayed over the video content, but which only takes up a portion of the display screen 312 (see e.g., FIG. 6). Moreover, timeline 320 may include a representative portion of image frames from the video content, such $\frac{1}{2}$ to $\frac{1}{100}^{th}$ of the number frames in the video content, for example, so as not to inundate the viewer with numerous image frames that are nearly identical to each other. Image scaling module 204 may be configured to process data from storage module 218 and thereafter send the processed data in the form of images to display screen 312. For example, image scaling module 204 may read image data from storage module 218 and process the image data by increasing or decreasing the size of the image to be displayed on display screen 312, such as displaying images in the form of a timeline 320, or in the form of an expanded frame 622. Image scaling module 204 may also process image data from storage module 218 by designating particular image data as bookmarks, or otherwise tagging the image data with additional metadata based on input from the user. The images may be a collection of images 322 displayed in the form of a timeline 320, and the images 322 within the timeline 320 are preferably in chronological order. The timeline 320 and images 322 within the timeline 320 may have a default size, or resolution, on display screen 312, or may vary in size, depending on a user input. For example, if the display screen 312 is 6"×8" (10" diagonal) and has a resolution of 1024×768, the image scaling module may cause the timeline to be 1" tall and extend across the length of display screen 312, such that the timeline has dimensions of 8"×1", and may have a resolution of 1024×76. The timeline 320 may be expanded or reduced in size, as explained further below. Individual frames or images within timeline 320 may have a much smaller resolution or size than the timeline 320 as a whole; but the size or resolution of individual frames within timeline 320 may depend on the number of frames in timeline 320, or the extent of "zooming" in or out within timeline 320, as explained further below. The aspect ratio of each frame within the timeline may be preserved as the timeline is expanded or reduced in size. Images (e.g. 622 in FIG. 6) that are selected for expansion from timeline 320 may also have a default size, which size may be adjusted by the user, as explained further below.

Image scaling module 204 and output module 212 may be configured to read and convert different video image file formats as they are read from storage module 218. For example, image scaling module 204 and output module 212 may be configured to read and/or convert AVI, MPEG-3, MPEG-4, MOV, 3GP, AVCHD, FLV, RM, or WMV, for example. As an example, video source 107 may send video data to tablet 120 in WMV format, and image scaling module 204 and output module 212 may convert this video data to MOV format, or another format, for proper display on tablet 120. Importantly, the present invention may be employed as an add-on to provide added functionality in any conventional video player application, such as Quicktime®, Windows Media Player®, iTunes®, Android Media Player®, Real Media Player®, etc.

Input detection module 210 is configured to detect a user input. For example, input detection module 210 may detect when and how a user touches the touch-sensitive display of tablet 120, and may convert the user's tactile input to tactile input data. The user's tactile input may comprise movement of one or more fingers across the display screen, which may be interpreted by the input detection module as one or more user gestures. For explanatory purposes, dotted circles 328 (FIG. 3) may represent user input, such as one or more fingers touching the display screen. The time, location on the display screen, speed, frequency, and relative motion of a user's tactile input may be monitored by the input detection module 210 and used to generate tactile input data.

Like other modules, the input detection module 210 may have executable instructions stored in a program memory, either within the module itself or in storage module 218. One or more processors coupled to or within the modules are configured to carry out the executable instructions to allow the module to carry out its functions. Using executable instructions and a processor, the input detection module 210 is able to read and detect user input such as tactile inputs or gestures. Where someone touches his or her finger(s) on the display screen can be readily determined by the input detection module 210 as x-y coordinates on an x-y coordinate system 306 using conventional techniques. A separation distance between the two or more finger input locations can therefore be determined. For example, touching the display screen with two fingers defines opposing vertices of a rectangle and the diagonal dimension between these vertices is equal to the separation distance between the two fingers. The starting location of one or more fingers and the separation distance between two or more fingers can be monitored by the input detection module 210. One or more fingers may be moved while maintaining contact with the display screen 312. Accordingly, the time, location on the display screen 312, speed, and relative motion of a user's tactile input may be monitored by the input detection module 210 and used to generate tactile input data.

The tactile input data can be processed by the image scaling module 208 to control or adjust images 322 or a timeline 320 displayed on display screen 312. For example, tactile input data and video content can be used by the image scaling module 208 to display a timeline 320 of images 322, modify one or more images 322 within the timeline 320, or display one or more images 322/622 separate from a timeline. Input detection module 210 may be further configured to monitor user inputs at the images and/or timeline displayed by the image scaling module 208. For example, image scaling module 208 may process tactile input data and thereby display a timeline 320 of images 322 from the video content. A user may desire to increase or decrease the size of the timeline 320 and touch the display screen 312 at an edge or corner of the timeline 320, and drag the edge or corner of the timeline 320 to a new location, thereby increasing or decreasing the size of the timeline 320. This may be accomplished by the input detection module 210 generating additional tactile input data and the image scaling module 208 processing this additional tactile input data to adjust the timeline 320 and/or images 322 displayed by the image scaling module 208.

Referring to FIG. 3, display screen 312 may comprise various components for displaying the video content, as is well known in the art. For example, depending on the type of device, the video content may be displayed on one or more of a plasma display panel (PDP), liquid crystal display (LCD), thin film transistor (TFTLCD), super LCD, light emitting diode (LED), organic LED (OLED), active matrix OLED (AMOLED), LED-backlit LCD, super AMOLED, or a retina display. An exemplary embodiment, however, uses a tablet 120 with a capacitive touch-sensitive display panel.

The video content may be displayed as video, animation, slide show, a single image, and/or a collection of images, for example, in the main body 318 or in a navigation portion 316 of the display screen 312. In an exemplary embodiment, the video content is displayed as (i) video in the main body 318 and (ii) images in a chronological sequence in the form of a timeline 320 in the navigation portion 316 of the display screen 312. Alternatively, a sequence of images may be displayed in each "frame" (such as within each of "frames" A-I in FIG. 4) in the navigation portion 316, such that a number of mini-videos are displayed that repeat from a beginning frame to an end frame of the respective sequence of images. Navigation portion 316 may comprise a timeline 320, which may depict images 322 from the video content in a chronological sequence.

As shown in FIG. 3, the device may be a tablet 120 and a user input may comprise movement of one or more fingers across the display screen 312, which may be considered user gestures. Dotted circles 328 may represent user input, such as one or more fingers touching the display screen 312 and which may be interpreted by the input detection module 210 as one or more gestures.

Figure 4:
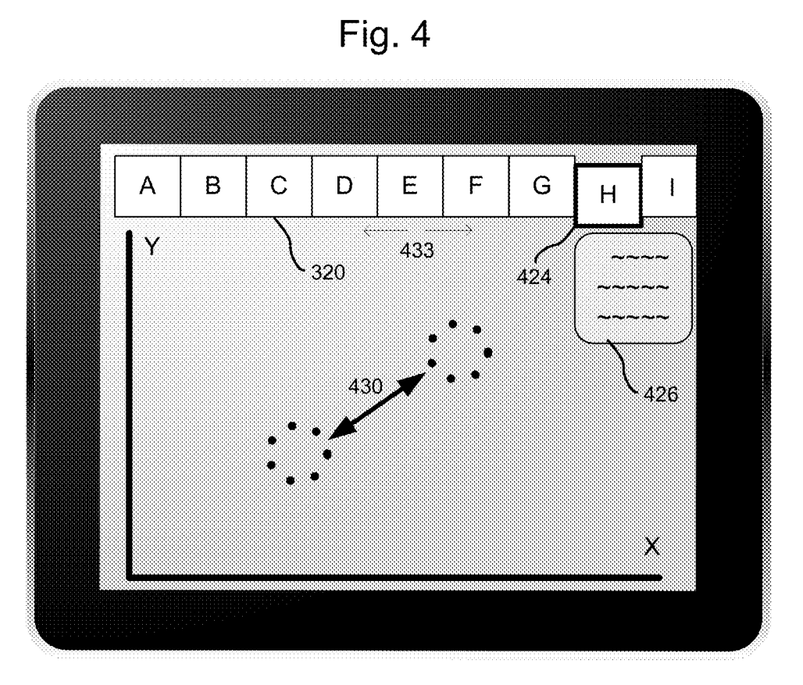
FIG. 4 depicts navigation and bookmarking of video content on a display screen of a mobile device, according to an exemplary embodiment of the invention.
Figure 5:
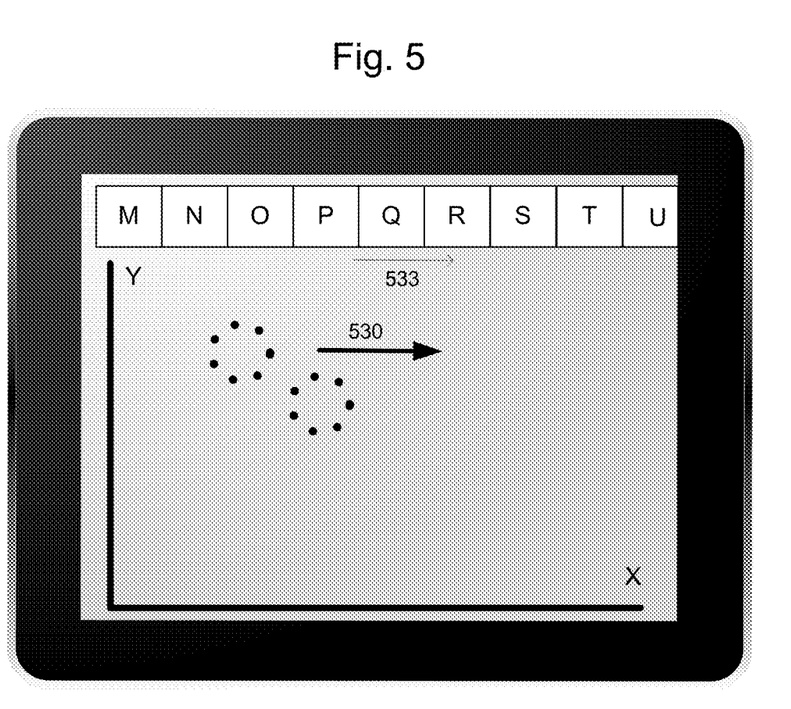
FIG. 5 depicts navigation of video content on a display screen of a mobile device, according to an exemplary embodiment of the invention.

A viewer may be viewing video content and desire to view a particular frame of the video content while continuing to watch the video, or jump the video to the particular frame. The viewer may touch the display screen 312 which may cause the timeline 320 containing video image frames 322 to appear on the display screen 312. The viewer may swipe one or more fingers across the display screen in a first direction 530 (as shown, for example, in FIG. 5) to scroll the video timeline 320 in a corresponding first direction 533, or may swipe one or more fingers across the display screen 312 in a second direction to scroll the video timeline 320 in a corresponding second direction. This and other types of gestures may only affect navigation of the timeline 320 and not affect the video playing in the main body 318 of the display screen. Alternatively, the video may be paused, automatically or manually, while the user navigates through frames of the video content in the navigation portion 316. For example, a single tap on display screen 312 while the video is playing may cause timeline 320 to appear. Alternatively, a double tap on display screen 312 while the video is playing may cause the video to pause and also cause timeline 320 to appear. Timeline 320 may disappear after a predetermined time period (e.g. 5-10 seconds) if additional user input is not detected. As reflected in FIG. 5, the viewer may touch the display screen 312 with two fingers, such as an index finger and a middle finger, and then move these fingers to the right of the display screen 312 in a swiping gesture, represented by arrow 530. Such swiping gesture may cause frames in the timeline 320 to scroll to the right (as represented by arrow 533), such that earlier frames in the timeline 320 are now displayed within the timeline 320 on the display screen. For example, after a viewer makes a swiping gesture as reflected in FIG. 5, the timeline 320 may display frames A, B, C, D, E, F, G, H, I in the timeline 320, as shown in FIG. 4, instead of frames M, N, O, P, Q, R, S, T, U, as shown in FIG. 5. Preferably, the new frames appear within the timeline 320 gradually in a smooth fashion, and the speed to which new frames appear in the timeline 320 may depend on the speed of the viewer's swiping gesture 530. Gestures, such as swiping gesture 530, may be considered a vector having both speed and a direction. Corresponding motion of frames in the timeline 320 may therefore have "momentum" such that new frames continue to appear even after the viewer has finished the swiping gesture 530. The momentum of the frames moving in the timeline 320 may depend on the speed of the viewer's swiping gesture, and such momentum may be damped such that the frames moving in the timeline 320 quickly come to a halt after a viewer's swiping gesture 530, the rate of damping being predetermined damping rate. Alternatively, a damping time may be predetermined such that the frames moving in the timeline 320 may come to a halt after a predetermined period of time, regardless of the speed of the viewer's swiping gesture. A predetermined rate of damping or a predetermined damping time may depend on the particular image frames being displayed in timeline 320 as the viewer's swiping gesture is received. For example, the damping rate may be higher (or the damping time may be lower) when bookmarked frames are displayed in timeline 320 while scrolling through frames in timeline 320. This would allow the user to scroll quickly through un-bookmarked frames, yet draw more attention to the location of bookmarked frames if such bookmarked frames are not scrolled through as quickly as un-bookmarked frames.

Referring to FIG. 3, the viewer may move two or more fingers closer together on the display screen 312 in a "pinching" gesture 330, which may cause a zooming effect on the video timeline 320. In some embodiments, pinching with more than two fingers (e.g., three or four fingers) may increase or decrease the rate of zooming. Moving two or more fingers closer together on the display screen may cause more video frames of the video content to be displayed within the video timeline 320, as represented by arrows 333, and such pinching may be considered a "zoom out" function in that the frames within timeline 320 decrease in at least one dimension, such as a width and/or height of the frames. Such zooming out, or changes in scaling or sizing of the frames, may be performed by the image scaling module 208. There may be a maximum amount to which the timeline may be zoomed out, such as when all frames of the video content are displayed within the timeline 320 on the display screen 312. Similar to that explained above, additional frames may enter the timeline 320 gradually in a smooth fashion, and the speed to which additional frames enter the timeline 320 may depend on the speed of the viewer's pinching gesture 330. Also, motion of frames entering the timeline 320 may have momentum, as described above, such that frames continue to enter the timeline 320 even after the viewer has finished the pinching gesture 330. The momentum of the frames entering the timeline 320 may depend on the speed of the viewer's pinching gesture 330, and such momentum may be damped, similar to that explained above.

Referring to FIG. 4, the viewer may move two or more fingers farther apart on the display screen 312 in an "un-pinching" gesture 430, which may also cause a zooming effect on the timeline 320. For example, moving two or more fingers farther apart on the display screen 312 may cause fewer video frames of the video content to be displayed within the timeline 320, and such un-pinching may be considered a "zoom in" function in that the frames within timeline 320 increase in size. Such zooming in or changes in scaling or sizing of the frames may be performed by the image scaling module 208. There may be a maximum amount to which the timeline 320 may be zoomed in, such as when only one or a few frames of the video content are displayed within the timeline 320 on the display screen 312. If only a representative portion of image frames from the video content are displayed in timeline 320 (such ½ to $\frac{1}{100}^{th}$ of the number frames in the video content), then upon a zooming in gesture, additional frames from the video content may be displayed in timeline 320 (i.e., frames that were not among the "representative portion"). For example, if only $\frac{1}{50}^{th}$ of the image frames of the video content are displayed when timeline 320 is initially displayed, then a zooming in gesture by the viewer may cause the image scaling module 208 to display $\frac{1}{40}^{th}$ or $\frac{1}{25}^{th}$ of the image frames of the video content in timeline 320, depending on the extent of the zooming gesture and/or the number of zooming gestures. Also, similar to that explained above, frames may leave the timeline 320 gradually in a smooth fashion, and the speed to which frames leave the timeline 320 may depend on the speed of the viewer's un-pinching gesture 430. Also, motion of frames leaving the timeline 320 may have momentum, as described above, such that frames continue to leave the timeline 320 even after the viewer has finished the un-pinching gesture 430. The momentum of the frames leaving the timeline 320 may depend on the speed of the viewer's un-pinching gesture 430, and such momentum may be damped, similar to that explained above.

The timeline 320 may appear horizontally or vertically on the screen, or may take up most of the screen. The disposition and size of timeline 320 may be adjusted by user preference. Timeline 320 may contain frames (or placeholders) of loaded video content, downloaded video content, previously-played video content, yet-to-be played video content, or all the video content of the video data received or in the process of receipt at the input module 204. If the video content is being streamed to tablet 120, or not all of the video content is stored in storage module 218, but the length of the video content is known, timeline 320 may display placeholders for the video content that has not been received by tablet 120. Alternatively, only frames of video content that have been received by tablet 120, or only frames of video content that has been played on tablet 120, may be displayed in timeline 320, so that the user would not have to scroll through the entirety of the video content to find particular frames of interest. With regard to the disposition of timeline 320, if timeline 320 is horizontal, a swiping motion to the right of the video display may cause the frames in the video timeline 320 to move to the right of the timeline 320, such that frames at the left of the timeline 320 are then visible on display screen 312. Similarly, if the timeline 320 is vertical, a downward swiping motion on the video display may cause the frames in the video timeline 320 to move downward in the timeline 320, such that frames "above" the timeline 320 may then be visible. Such directional motion of the frames within the timeline 320 relative to the user's gesture may be reversed, depending on user preference, and may be performed by the image scaling module 208.

Figure 6:
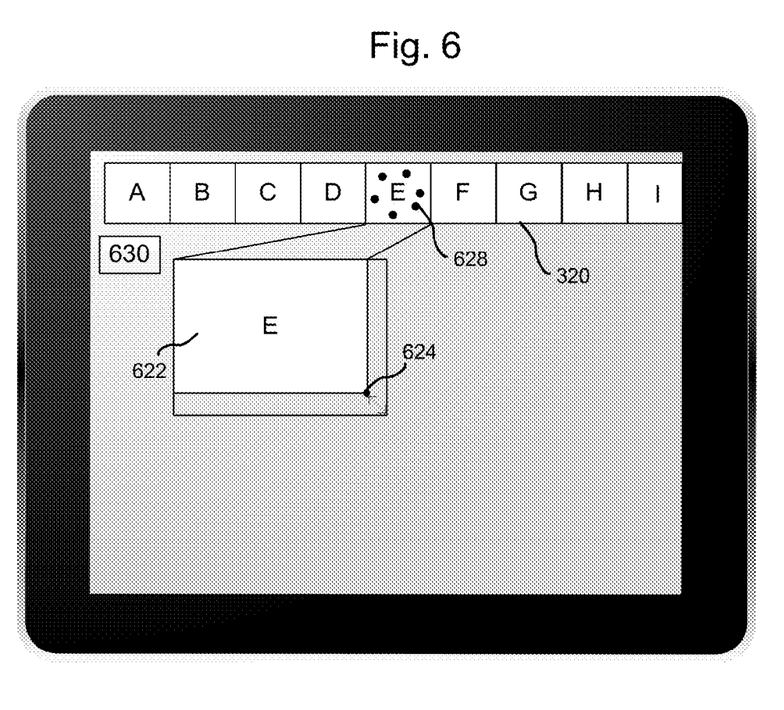
FIG. 6 depicts further navigation of video content on a display screen of a mobile device, according to an exemplary embodiment of the invention.

The object of the viewer's swiping, pinching, or un-pinching gestures, for example, is to locate particular frames of interest within the plurality of frames in the video content or in the timeline 320, the plurality of frames making up the entirety of the video content or a portion of the video content. For example, a viewer may be watching a video of an instructor in a classroom teaching a lecture and the viewer may be a student at a distant location watching the lecture live or a previously-recorded version of the lecture. During the lecture the instructor leaves the podium to write on a whiteboard, or refers to a presentation on a screen away from the lecturer, for example. The camera recording the lecture temporarily pans to the whiteboard or presentation screen and then pans back to the lecturer. The viewer of the video is at a disadvantage compared to students in the classroom attending the lecture in that the viewer is unable to view both the whiteboard/presentation screen and the lecturer at the same time, but instead must view only what is captured by the camera, and in the sequence captured by the camera. Students in the classroom, meanwhile, can view any portion of the classroom with a simple turn of their head any time they wish. Using the embodiments described herein, the viewer may easily view earlier portions of the video that focused on the whiteboard or presentation screen, and may do so while the lecture continues its natural progression. For example, the lecturer may have written on a whiteboard in frame "E" of the video content, and at such frame, the camera zoomed to capture the writing on the whiteboard, and then panned back to the lecturer at a later frame, e.g., frame "G." Later, at frame "T" for example, the lecturer again refers to the whiteboard but the camera does not again pan to the whiteboard. The viewer desires to see again what was written on the whiteboard, but does not know exactly the frame(s) at which the camera zoomed in to capture the writing on the whiteboard. While the lecture continues, i.e., while the video content continues to play in its natural progression in the main body 318 of the display screen 312, the viewer may touch the display screen 312, which may cause timeline 320 to be displayed. The black portion at the right of timeline 320 in FIG. 3 may reflect video content that has yet to be created because the viewer is watching a live lecture. Alternatively, the black portion may reflect video content that has not yet loaded or downloaded to the viewer's device 120. Timeline 320 shows a plurality of frames 322, but the viewer may be unable to determine from this perspective the particular content recorded in each frame 322. The viewer may make an "un-pinching" gesture 430 to zoom in on particular frames 322 in the timeline 320. This un-pinching gesture 430 may be input anywhere on the display screen and not affect the video playing in the main body 318 of the display screen. Such un-pinching gesture 430 may result in frames M through U being displayed, such as in the timeline 320 shown in FIG. 5. After looking at the "thumbnail" views of frames M through U, the viewer may determine that the desired frame was recorded prior to frame M. Accordingly, the viewer may then make a swiping motion to the right, such as the swiping motion 530 shown in FIG. 5. One or more swiping motions may result in frames A through I being displayed, such as in the timeline 320 shown in FIG. 4. After looking at the thumbnail views of frames A through I, the viewer determines that the desired frame was recorded in frame E. Accordingly, the viewer may then tap frame E with a finger, as reflected by dotted circle 628 in FIG. 6, which may cause frame E to expand to a portion of the display screen 312, such as in a pop-up screen 622 in the top-left portion of display screen 312. The viewer may lock expanded frame E 622 in a number of ways, such as by tapping on the expanded view of frame E 622, such that the expanded view of frame E 622 continues to be displayed while the video content continues to play in the main portion 318 of the display screen. Once expanded frame E 622 is displayed, the viewer may tap the display screen 312 again (outside of expanded frame E 622, for example) to cause the timeline 320 to disappear. Alternatively, expanded frame E 622 may automatically lock in place and the timeline 320 may disappear after a predetermined time, such as after 1 to 5 seconds. Whether timeline 320 disappears upon detection of further viewer input, or whether timeline 320 disappears automatically may be set by user preference in a preferences menu. If timeline 320 is set by user preference to disappear after a predetermined time, the predetermined time may vary depending on a number of factors, including whether the video is currently playing or paused. If the video continues to play, then timeline 320 may disappear more quickly (e.g., 1-2 seconds). If the video is paused, then timeline 320 may take more time to disappear (e.g., 3-5 seconds). The viewer may also move expanded frame E 622 to other areas of the display screen 312 by tapping frame E 622 and then dragging frame E 622 to the desired area. The viewer may also resize expanded frame E 622 by tapping expanded frame E 622 and dragging one or more corners or edges of expanded frame E 622, such as the bottom right corner 624, until the desired size of frame E is achieved by such dragging, as shown in FIG. 6.

While viewing thumbnail views of frames A through I in the timeline 620, the viewer may be uncertain as to which frame best depicts the desired content. The viewer may tap on any of the thumbnail frames 322 in the timeline 320 to select and expand any particular frame, and may tap a second time on the selected thumbnail frame to remove the expanded view of the particular frame from the display screen 312. Alternatively, the viewer may tap a separate thumbnail frame in the timeline 320 and this separate thumbnail frame may automatically replace a previously expanded frame. For example, in FIG. 6, the viewer may tap frame F in the timeline 320 and frame F may expand and replace expanded frame E 622. Alternatively, one or more frames may appear in an expanded form any time timeline 320 is displayed on display screen 312, such as a middle frame in timeline 320, and such an expanded frame(s) may automatically change to another frame upon a swiping motion, and may disappear when timeline 320 disappears if the user has not provided input to have the expanded frame remain visible.

The various gestures, such as swiping, pinching, or un-pinching, for example, may be performed by the viewer while the video is playing or while the video is paused. The timeline may be displayed permanently on the display screen while the application which is playing the video is running. Alternatively, the timeline 320 may be displayed only when desired by the viewer, such as after tapping the display screen 312 with one or more fingers, and may disappear (i.e., turn off) after tapping the display screen 320 again. The timeline 320 may be displayed along with video controls, such as play/pause, forward, reverse, volume controls, etc. The timeline 320 may have its own exit button, such as an "X" in a corner of the timeline 320, which the viewer may tap to make the timeline 320 disappear from the display screen 312. The timeline 320 may also be controlled through menu functions of the application playing the video content, and may be turned on or turned off through such menu functions.

Various gestures may affect expanded frames of the timeline 320. For example, a viewer may wish to zoom in or out on expanded frame E 622. This may be accomplished by pinching or un-pinching directly within expanded frame E 622. After zooming in on a portion of expanded frame E 622 such that only a portion of original frame E is displayed in expanded frame E 622, the viewer may perform a swiping gesture within expanded frame E 622 to move to another portion of original frame E (under 628) in expanded frame E 622. For example, it may be difficult to read the lecturer's writing on the whiteboard because the camera recording the lecture did not zoom in sufficiently when recording that particular frame. The viewer may zoom in within a particular expanded frame and then center the desired image data within the expanded frame in order to properly zoom in on the content for visualization purposes. The viewer may continue to view the expanded frame on the display screen 312 while continuing on with the video content (e.g., lecture) in the main body 318 of the display screen 312.

It should be appreciated that when a viewer navigates through the video timeline 320 and selects particular frames for viewing on a portion of the display screen 312, the video displayed on the remainder of the display screen may not itself revert to the selected frame(s), and may continue to play or be paused during user navigation. In exemplary embodiments, the video continues to play in the main body 318 of the display screen 312 while the viewer navigates to and views particular frames of the video content in thumbnail or expanded views. In other embodiments, the viewer may jump the video that is playing (or that may be paused) to the selected frame(s), such that a viewer may find a beginning frame of interest and may select that frame and thereby cause the video to start playing at that particular frame in the main body 318 of the display screen 312. A "return" button (not shown) may appear on the display screen 312 to allow the user to return to the last-viewed frame before jumping to another frame of the video. The viewer may jump the video to a particular frame in the above manner by, for example, the viewer multi-tapping on the desired frame within the timeline 320 or on an expanded frame. Moreover, to further aid the viewer in navigating the plurality of frames, the presently playing frame may be highlighted within timeline 320 in a number of ways, such as with a colored border around the frame, or with a small arrowhead 340 pointing to the presently playing frame, for example.

A bookmarking ability of particular frames in a number of ways may also be available. For example, the viewer may tap a bookmark button 630 on the screen when video frame of interest is displayed, which may effectively bookmark the frame within the timeline 320. Alternatively, a physical button on a side of tablet 120 may be pressed to bookmark particular frames while watching the video content. The viewer may add a description to the bookmark to allow the viewer to more easily navigate a plurality of bookmarks. Bookmarked frames may be distinguished in a number of ways, such as appearing as highlighted frames within the timeline, or having a colored or thickened border around the frame. Bookmarked frames may be slightly moved out of place within the timeline, such as moved slightly downward within the timeline, so as to allow the viewer to easily navigate to bookmarked frames. Frame H 424 in FIG. 4 is one example of a bookmarked frame. Frame H 424 is moved slightly downward relative to other frames in the timeline 420, and also has a thickened border, so as to highlight this frame for future navigation. Alternatively, the bookmarks may be displayed in a list format instead of graphically affecting the timeline itself. Double tapping on frame H 424 may allow a user to bookmark frame H and/or enter a description of frame H. Single tapping on frame H 424 may cause the user's description to appear for a few seconds (e.g., 1-3 sec) or permanently until frame H is tapped again, or caused to be removed by user input.

As an example of the bookmarking process, the viewer may be watching the lecture referred to above and at frame H the camera recorded the whiteboard or presentation screen. While this frame (or frames) was being played, the viewer may tap a bookmark button 630 which causes the particular frame being played to be bookmarked. The bookmarked frame may immediately be inserted into a list of bookmarks and/or given a graphical distinction relative to other frames in the timeline, such as a downward displacement, thickened border, and/or color highlighting, for example. Alternatively, the viewer may double tap the particular frame in the timeline 420 to bookmark the desired frame. Other options may be used to bookmark a particular frame or frames, such as by triple tapping on the main body 318 of display screen while the video is playing, or making some other gesture on display screen, whether the timeline 320 is displayed or not.

Figure 7:
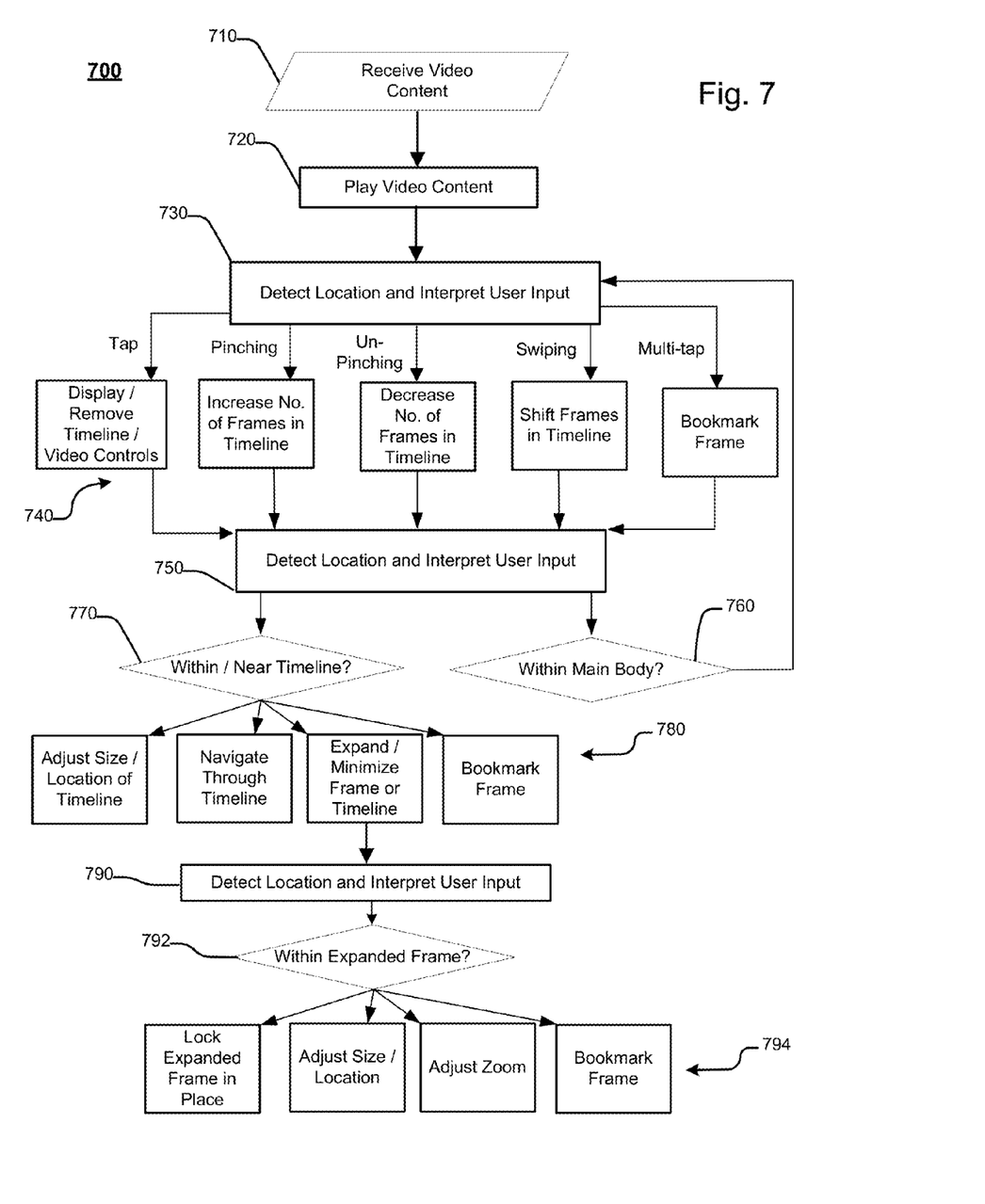
FIG. 7 depicts an illustrative flowchart of a method for navigating video content, according to an exemplary embodiment.

Referring to FIG. 7, an illustrative flowchart of a method for navigating to a desired frame of a video is shown. This exemplary method 700 is provided by way of example, as there are a variety of ways to carry out methods according to the present disclosure. The method 700 shown in FIG. 7 can be executed or otherwise performed by one or a combination of various systems and modules. The method 700 described below may be carried out by system 100 shown in FIG. 1 and touch device 201 (e.g. tablet 120) shown in FIG. 2, by way of example, and various elements of the system 100 and mobile device 120 are referenced in explaining the example method of FIG. 7. Each block shown in FIG. 7 represents one or more processes, decisions, methods or subroutines carried out in exemplary method 700, and these processes, decisions, methods or subroutines are not necessarily carried out in the specific order outlined in FIG. 7, nor are each of them required. Referring to FIG. 7, exemplary method 700 may begin at block 710.

At 710, video content may be received at input module 204 from network element 204, video source 107, data storage 108, or from storage module 218 in one of a number of formats. Tablet 120 may record video using a built-in camera, or may receive video content via network 102 from an external source. Video content may be streamed, downloaded, buffered, etc., according to conventional techniques. As mentioned above, the present invention, including exemplary method 700, may be employed as an "add-on" in any conventional video player application.

At 720, the output module 212 may begin playing the video content on tablet 120 upon receiving user input. The video content may be displayed in a full-screen window using a video player application on tablet 120. Alternatively, the video content may be displayed external to tablet 120 on another display or screen, yet controlled by tablet 120 through user input on display screen 312. The video content may or may not be displayed externally and concurrently on the tablet 120 itself.

At 730, the input detection module 210 may detect and interpret any user input, such as touch input or gestures on display screen 312. The input detection module 210 may monitor display screen 312 continuously and not just at 730, so as to be able to detect and interpret user inputs throughout all of method 700. User input may be in a variety of forms including, but not limited to, a tap gesture, a pinching gesture, an un-pinching gesture, a swiping gesture, or a multi-tap gesture, for example. Double- or triple-tapping may be considered forms of multi-tapping. These exemplary gestures are designated as 740 in FIG. 7.

Input detection module 210 may detect a single tap gesture on display screen 312, and may generate tactile input data reflecting the detected gesture. Image scaling module 208 may process the tactile input data and may cause timeline 320 to be displayed on display screen 312. Output module 212 or another module within tablet 120 may also cause video controls to be displayed on display screen 312 as a result of the single tap gesture, which video controls may be used to control playback of the video content. Detection of another tap gesture on display screen 312 by input detection module 210 may cause the image scaling module 208/output module 212 to remove timeline 320 and/or video controls from display screen 312. This may occur while the video continues to play or while the video is paused.

Input detection module 210 may detect a pinching gesture on display screen 312, and may generate tactile input data reflecting the detected gesture. Image scaling module 208 may cause timeline 320 to be displayed on display screen 312 and may adjust timeline characteristics, such as the number of frames displayed in the timeline 320, based on the extent of the pinching gesture. For example, a pinching gesture may cause one or more additional frames to be displayed in timeline 320, and may be considered zooming out so as to see more frames within timeline 320. Having more frames displayed within timeline 320 may provide the viewer with a better "bird's eye view" of the video content, thereby allowing the viewer to navigate more quickly to chronologically distant frames of the video content relative to the frame that is currently playing. This may occur while the video continues to play or while the video is paused. The timeline 320 may be centered around the currently playing frame each time it is initially displayed, and may continue to be centered around the currently playing frame regardless of various user input. However, swiping gestures may cause the timeline 320 to no longer be centered around the currently-playing frame.

Input detection module 210 may detect an un-pinching gesture on display screen 312, and may generate tactile input data reflecting the detected gesture. Image scaling module 208 may cause timeline 320 to be displayed on display screen 312 and may adjust timeline characteristics, such as the number of frames displayed in the timeline 320, based on the extent of the un-pinching gesture. For example, an un-pinching gesture may cause one or more fewer frames from being displayed in timeline 320, and may be considered zooming in so as to see fewer frames within timeline 320. Having fewer frames displayed within timeline 320 may allow for greater visual detail within each displayed frame within timeline 320, thereby allowing the viewer to determine more precisely what is shown in the displayed frames. This may occur while the video continues to play or while the video is paused.

Input detection module 210 may detect a swiping gesture on display screen 312, and may generate tactile input data reflecting the detected gesture. Image scaling module 208 may cause timeline 320 to be displayed on display screen 312 and may adjust timeline characteristics, such as the particular frames displayed in the timeline 320, based on the extent of the swiping gesture. For example, a swiping gesture to the right may cause earlier frames in the chronological sequence of frames to be displayed in timeline 320, and may be considered a scrolling function so as to display different frames within timeline 320. Alternatively, a swiping gesture to the left may cause later frames in the chronological sequence of frames to be displayed in timeline 320. Having the ability to scroll through frames displayed within timeline 320 allows the viewer to navigate to earlier or later frames while the video continues to play or while the video is paused.

Input detection module 210 may detect a multi-tap gesture on display screen 312, and may generate tactile input data reflecting the detected gesture. Image scaling module 208 may or may not cause timeline 320 to be displayed on display screen 312. One exemplary result of a multi-tap gesture, such as a double-tap or triple-tap gesture, is that a bookmark may be created. As mentioned above, bookmarks may be effective for allowing the user to navigate immediately to a particular frame of the video content that has been bookmarked, and view a still image of that bookmarked frame or have the video resume playback at that bookmarked frame. Also, the viewer may add a description to the bookmark to allow the viewer to more easily navigate a plurality of bookmarks, and the bookmarked frames may be graphically distinguished, such as appearing as highlighted frames within the timeline 320, or be slightly moved out of place within the timeline 320, so as to allow the viewer to easily navigate to bookmarked frames, as explained above.

Input detection module 210 may continue to monitor display screen 312 for touch input or gestures, and may detect the location of additional user input at 750. If user input is detected within the main body 318 of display screen 312, such as at 760, then the method may revert back to 730 such that user input within the main body 318 of display screen 312 may be interpreted as one of the exemplary gestures listed at 740.

If user input is detected within or near timeline 320, such as in navigation area 316 of display screen 312, then the timeline 320 itself, or images 322 within the timeline 320, may be adjusted. For example, if the viewer taps and drags a corner or edge of timeline 320, then timeline 320 may be resized. The viewer may also tap and drag another portion of timeline 320 so as to move timeline 320 to another portion of display screen 312.

Various gestures may be detected on or near timeline 320. For example, a swiping gesture within timeline 320 may allow a viewer to navigate to earlier or later portions of the video content, causing different frames to be displayed in timeline 320, as described above. Alternatively, tapping a particular frame once or multiple times may cause the particular frame that is tapped to expand in size and appear as a pop-up window in the top-left portion (or another portion) of display screen 312. Tapping once or multiple times on timeline 320 or on particular frames within timeline 320 may also allow the viewer to expand or bookmark a particular frame. For example, a long tap (e.g. a tap and hold for 1-3 seconds), or a double or triple tap on a particular frame within timeline 320 may cause that particular frame to be bookmarked, as described above. Moreover, tapping on or near a portion of the timeline 320 may cause timeline 320 to disappear or minimize. A previously-expanded frame, such as frame 622 in FIG. 6, may remain expanded or may disappear/minimize along with timeline 320.

Input detection module 210 may continue to monitor display screen 312 for touch input or gestures, and may detect the location and interpret additional user input at 792. If user input is detected within an expanded frame, such as expanded frame 622 in FIG. 6, the image scaling module may take various exemplary actions at 794. For example, a long tap, a single tap, or a double tap, for example, may cause expanded frame 622 to lock in place and may or may not cause timeline 320 to disappear/minimize. A tap and drag on a portion, such as a corner or edge, of expanded frame 622 may cause expanded frame 622 to be resized. A tap and drag on another portion, such as an interior, of expanded frame 622 may cause the expanded frame 622 to be moved to another location.

A double tap detected by the input detection module 210 within expanded frame 622 may cause the image scaling module 208 to adjust the zoom. For example, one double tap may zoom in on a portion of the expanded frame 622 (zoom in at the tapped location, for example). Another double tap gesture may zoom out to a default zoom of expanded frame 622. Alternatively, a long tap, a double tap, or a triple tap on expanded frame 622 may cause that particular frame to be bookmarked, as described above.

User input may also comprise voice commands. For example, a "voice interaction mode" may be used to allow the user to control, for example, display of timeline 320, expanded frame 622, zooming, swiping, bookmarking, etc. For example, instead of pinching or unpinching, in a voice interaction mode the user may simply state, "zoom out" or "zoom in," respectively. Other voice commands may include, "scroll right," "scroll left," "scroll up," "scroll down," "bookmark," "expand," "pause," "play," etc.

In summary, embodiments may provide a system and method for navigating to particular portions of video content, such as particular frames within a timeline of the video content, to allow the viewer to view one or more still images (frames) of the video content while continuing to watch the video content. User input, such as touch gestures or voice input, may be interpreted to allow the user to navigate more quickly to desired frames and also display one or more frames concurrently with the playing video in a pop-up window, for example.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

What is claimed is:

1. A method comprising:
receiving, by a processor, video content to be provided for presentation on a display;
playing, by the processor, the video content;
detecting, by the processor and while the video content is playing, a first user input;
providing, for presentation by the processor and while the video content is playing, a first depiction of one or more image frames, of a plurality of image frames of the video content, based on detecting the first user input;
detecting, by the processor and while the video content is playing, a second user input; and
providing, for presentation by the processor and while the video content is playing, a second depiction of the one or more image frames, of the plurality of image frames, based on detecting the second user input,
the second depiction being different than the first depiction.

2. The method of claim 1, wherein the first depiction comprises a timeline of the plurality of image frames.

3. The method of claim 1, wherein the second depiction comprises an expanded frame of one of the plurality of image frames.

4. The method of claim 1, wherein the second user input comprises a tapping gesture.

5. The method of claim 4, wherein the tapping gesture of the second user input causes a particular frame of the one or more image frames to be expanded in size.

6. The method of claim 1, wherein the second user input comprises one of a pinching gesture, an un-pinching gesture, and a swiping gesture.

7. The method of claim 6, wherein the pinching gesture causes additional image frames, of the plurality of image frames, to be provided for presentation in a timeline of the plurality of image frames, and the un-pinching gesture causes fewer image frames, of the plurality of image frames, to be provided for presentation, with respect to a number of image frames currently provided for presentation, in the timeline of the plurality of image frames.

8. The method of claim 6, wherein the swiping gesture causes chronologically different image frames, of the plurality of image frames, to be provided for presentation in a timeline of the plurality of image frames.

9. The method of claim 1, wherein the first depiction comprises a timeline of a first representative portion of the plurality of image frames, and
wherein the second user input comprises an un-pinching gesture which causes the second depiction to be provided for presentation,
the second depiction comprising a second timeline of a second representative portion of the plurality of image frames,
the second representative portion being greater than the first representative portion.

10. The method of claim 1, further comprising:
bookmarking, while playing the video content, a particular image frame of the one or more image frames to create a bookmark,
the bookmark including a description of the particular image frame.

11. A system, comprising:
a memory to store instructions; and
a processor to execute the instructions to:
receive video content;
play the video content on a display;
detect, while the video content continues to play, at least a first user input and a second user input; and
output, while the video content continues to play, at least a first depiction and a second depiction, of one or more of a plurality of image frames, to the display based on the first user input and the second user input, respectively,
the first depiction and the second depiction representing at least one of:
different scalings of the one or more of the plurality of image frames, or
chronologically different frames of the one or more of the plurality of image frames.

12. The system of claim 11, wherein the first depiction comprises a timeline of at least a portion of the plurality of image frames.

13. The system of claim 11, wherein the second depiction comprises an expanded frame of one of the plurality of image frames.

14. The system of claim 11, wherein the second user input comprises a tapping gesture.

15. The system of claim 14, wherein the tapping gesture of the second user input causes a particular image frame of the plurality of image frames to be expanded in size.

16. The system of claim 11, wherein the second user input comprises one of a pinching gesture, an un-pinching gesture, or a swiping gesture.

17. The system of claim 16, where the processor is further to:
provide additional image frames for presentation, in a timeline of the plurality of image frames, based on the pinching gesture, and
provide fewer image frames for presentation, in the timeline of the plurality of image frames, with respect to a number of image frames currently provided for presentation, based on the un-pinching gesture.

18. The system of claim 16, where the processor is further to:
provide the chronologically different frames for presentation in a timeline of the plurality of image frames based on the swiping gesture.

19. A non-transitory computer readable medium storing instructions, the instructions comprising:
one or more instructions that, when executed by one or more processors, cause the one or more processors to:
receive video content to be provided for presentation on a display;
play the video content;
detect, while the video content is playing, a first user input;
provide, while the video content is playing, a first depiction of one or more image frames, of a plurality of image frames of the video content, based on detecting the first user input;
detect, while the video content is playing, a second user input; and
provide, while the video content is playing, a second depiction of the one or more image frames, of the plurality of image frames, based on detecting the second user input,
the second depiction being different than the first depiction.

20. The non-transitory computer readable medium of claim 19, where the one or more instructions, when executed by the one or more processors, further cause the one or more processors to:

provide additional image frames for presentation, in a timeline of the plurality of image frames, based on a pinching gesture, provide fewer image frames for presentation, in the timeline of the plurality of image frames, with respect to a number of image frames currently provided for presentation, based on an un-pinching gesture, and provide chronologically different frames for presentation, in the timeline of the plurality of image frames, based on a swiping gesture.

* * * * *